United States Patent [19]

Shabalina et al.

[11] 4,168,156
[45] Sep. 18, 1979

[54] METHOD OF AND ELECTRIC FURNACE FOR PROCESSING NONFERROUS MOLTEN SLAGS

[76] Inventors: Roza I. Shabalina, ulitsa Udaltsova, 4, kv. 26; Mark M. Lakernik, Strastnoi bulvar, 13a, kv. 32; Alexandr F. Gavrilenko, ulitsa Yaroslavskaya, 1/9, kv. 71; Anatoly A. Yakovenko, bulvar Yana Rainisa, 14, korpus 2, kv. 73; Tatyana S. Egorova, ulitsa Mescheryakova, 9, kv. 2; Anatoly I. Golovachev, Otkrytoe shosse, 6, kv. 48; Leonid M. Bochkarev, ulitsa Chkalova, 18/22, kv.78; Iosif D. Reznik, Yaroslavskoe shosse, 55, kv. 193; Stanislav S. Parshin, Kastanaevskaya ulitsa, 46, kv. 52, all of Moscow, U.S.S.R.

[21] Appl. No.: 807,341

[22] Filed: Jun. 16, 1977

[30] Foreign Application Priority Data

Jun. 17, 1976 [SU] U.S.S.R. .............................. 2376160
Jul. 1, 1976 [SU] U.S.S.R. .............................. 2381040

[51] Int. Cl.² .......................... C22B 7/04; C22B 4/04
[52] U.S. Cl. ............................................. 75/14; 75/24
[58] Field of Search ...................................... 75/14, 24

[56] References Cited

U.S. PATENT DOCUMENTS

| | | | |
|---|---|---|---|
| 3,897,231 | 7/1975 | Massey | 75/24 |
| 4,032,327 | 6/1977 | Donaldson | 75/24 |
| 4,046,541 | 9/1977 | Anderson | 75/24 |

*Primary Examiner*—P. D. Rosenberg
*Attorney, Agent, or Firm*—Haseltine, Lake & Waters

[57] ABSTRACT

A method comprising the steps of supplying a carbonaceous reducer in a layer onto the surface of molten slag and feeding an oxygen-free gas into said slag in an amount and at a rate ensuring recirculation of said slag with its outflow onto the surface of said carbonaceous reducer layer and filtration therethrough. An electric furnace for carrying into effect said method, comprising a space defined by walls resting on a hearth and supporting a roof wherein are fixed electrodes, devices for charging slag and a carbonaceous reducer into the furnace, and there are provided tuyeres adapted for supplying an oxygen-free gas into the slag, said tuyeres being spaced apart at a distance substantially equal to that of 3 to 6 electrode diameters, and at a distance of 1 to 3 electrode diameters from the furnace walls the bottom nozzle edges of said tuyeres being in space relationship with the horizontal axis of either a matte or metal tapping notches with a distance therebetween of 0.3 to 2 electrode diameters.

6 Claims, 4 Drawing Figures

METHOD OF AND ELECTRIC FURNACE FOR PROCESSING NONFERROUS MOLTEN SLAGS

BACKGROUND OF THE INVENTION

The present invention relates to nonferrous metallurgy, and more particularly to methods of complex processing molten slags in electric furnaces with a purpose of recovering heavy metals (such as zinc, lead, copper, nickel, cobalt) and iron therefrom.

There are known in the art methods of processing molten slags produced, for example, by nickel smelting or containing low-grade tin concentrates, by their filtration through heated coke or coal filters. The prior-art methods envisage reducing metal oxides from the slags passed through a coke filter at a temperature of 1700° C. and over. The degree of reducing the metal oxides is adjusted by varying the height of a coke bed, its temperature and the time period during which the slag passes through the coke filter. This results in complete recovery of the nickel and cobalt, and that of 65% of iron from the slag.

The disadvantages of said prior-art methods reside in high power inputs for heating a coke filter and maintaining its temperature at 1700° C. and over, complicated servicing and the need for additional equipment.

There is likewise known in the art a method of treating slags produced in nickel smelting in an electrically-heated hearth with a coke filter. The hearth is formed of two vessels differing in height and communicating in their bottom part through a channel partly filled with a layer of molten matte. The slag is poured into the top area of said hearth wherein it is subjected to filtration at first through a layer of coke and then through a matter layer, flowing thereafter along the channel into the bottom area of the hearth to be settled out therein.

However, a single transitory filtration of said slag passing in a layer of non-uniform thickness through the coke filter fails to provide a requisite degree of reduction of metal oxides with the resultant low rate of removing said metal oxides from the slag.

There is also known in the art a method of recovering tin from low-grade concentrates by reduction smelting in an electric furnace in the presence of silica and sulphureous materials. Smelting of an initial charge is effected on a coal filter at temperatures sufficient to enable partial reduction of silica.

The aforesaid method also suffers from the disadvantage that it requires high power inputs for heating a carbonaceous filter and maintaining its temperature above 1500° C.

Moreover, the servicing of said electric furnace is coupled with difficulties stemming, firstly, from a need to maintain the requisite temperature of said coke filter, which presents a problem in view of the variable electrical conductivity of a layer, responsive to the degree of reducing oxides; secondly, from the difficulty to sustain a constant rate of filtration which tends to change as the coke particles burn out; thirdly, from the accumulation and tapping of both the slag and a high-melting-temperature ferriferous alloy, and finally from a need for additional equipment.

Known likewise in the art is a furnace divided by a partition into two parts and adapted for flash smelting of finegrained materials. In one part said materials are flash-smelted, the slag flowing through a port in the bottom part of said partition into the second part of the furnace, wherein are mounted electrodes which provide for both the heating of said slag and its stirring due to natural convective motion (see, e.g., Inventor's Certificate of the USSR No. 190578).

However, the aforedescribed furnace is not provided with any means for adjusting the stirring rate, which results in a low rate of reducing metal oxides from the slags, as well as in an inadequate degree of the slag depletion in terms of its valuable constituents.

There is likewise known in the art an electric furnace for smelting concentrates containing nonferrous metals, said furnace being equipped with burners mounted on its roof at an end face wall against a flue, and with a metal notch located on the opposite side. The furnace has a step-shaped hearth inclined towards said metal notch.

However, the aforesaid furnace also suffers from inadequately intensive stirring of the melt with the reducing flame of the burner mounted only on one side of the furnace which results in the low rate and degree of slag depletion.

SUMMARY OF THE INVENTION

The primary object of the invention is the provision of a method of and an electric furnace for processing nonferrous molten slags, which will make the processing of said molten slags less expensive by reducing power inputs.

Another no less important object of the invention is the provision of a possibility of enhancing the recovery of nonferrous metals and iron from the slag at lower temperatures.

Still another object of the invention is to simplify the technique of carrying the method of the invention into effect.

Yet another object of the invention is to make an electric furnace simple in operation.

An important object of the invention is to extend the service life of said electric furnace.

A further important object of the invention is to provide an electric furnace of small bulk by obviating devices for melting the slag and proportioning its flow rate to a filter.

Said and other objects of the invention are achieved by providing a method of processing nonferrous molten slags, envisaging treating a molten slag with a carbonaceous reducer, wherein, according to the invention, said carbonaceous reducer is supplied onto the surface of the molten slag in an amount ensuring the formation of a layer and maintaining the latter on the surface of the molten slag, wherein an oxygen-free gas is fed in flows in an amount and at a rate assuring recirculation of said molten slag, involving its outflow onto the surface of said layer of carbonaceous reducer and filtration therethrough.

Said techniques enable repeated filtration of the slag through the layer of a carbonaceous reducer. As a result, a better slag-to-reducer contact and a high rate of reducing metal oxides contained in the slag are attained, as well as more complete recovery of metals which requires less time with the ensuing reduction in both power and labor inputs.

In reducing metal oxides it is not advisable to use oxygen-containing gases.

It is expedient that an oxygen-free gas be fed into the molten slag heated to a temperature of 1200 to 1500° C.

The aforeindicated temperature range is the most favorable to enable effective metal recovery from the slag.

Conducting the herein-proposed process at a temperature below 1200° C. will bring about higher viscosity of slag, thus adversely affecting slag recirculation conditions. Moreover, the metal reducing rate diminishes at a temperature below 1200°.

If the proposed process is run at a temperature above 1500° C., the metal reducing rates will increase but the lining durability will deteriorate drastically.

It is preferable that an oxygen-free gas should be fed into the molten slag in an amount ranging from 30 to 100 nm$^3$ per ton of slag per hour.

The aforecited range will ensure slag recirculation through a carbonaceous reducer layer in an amount of 150 to 500 kg/min per square meter of the melt surface.

An hourly gas consumption below 30 nm$^3$ per ton of slag is inadequate for the outflow (circulation) of slag onto the layer of a reducer in an amount of 150 kg/min·m$^2$ of the melt surface and thus the requisite rate of reducing metals is impossible to achieve. An hourly gas consumption above 100 nm$^3$ per ton of slag results in intense spattering of the molten slag (exceeding 500 kg/min·m$^2$ of the melt surface), with the slag getting onto the furnace walls and roof and causing their destruction. In addition, the amount of flue gases will increase.

It is preferable that an oxygen-free gas should be fed into the molten slag in a flow at an angle not over 85° to the vertical.

Such direction of the gas flow ensures optimized conditions for the molten outflow onto the layer of a carbonaceous reducer.

As for an oxygen-free gas fed into said molten slag, use can be made of either inert or reducing gases.

It is possible to make use of nitrogen insofar as the process of reducing nonferrous metal oxides cannot be conducted in the presence of oxygen.

The herein-proposed method can be realized in an electric furnace for processing nonferrous molten slags, comprising a space defined by walls resting on a hearth and supporting a roof through which electrodes and devices for charging slag and a solid carbonaceous reducer are introduced, the furnace walls being fitted with notches for separate tapping of slag and a bottom product, wherein according to the invention, there are provided tuyeres spaced apart at a distance essentially equal to that of 3 to 6 electrode diameters and from the furnace walls at a distance of 1 to 3 electrode diameters, tuyere nozzle edges being arranged at a distance of 0.3 to 2 electrode diameters from the axis of the notch for tapping a bottom product.

The established ratios assure the most favorable conditions for carrying into effect the method of the invention in the proposed furnace.

It is inexpedient to place the tuyeres within a closer distance since in that case the melt streams from adjacent tuyeres may overlap. Where the tuyeres are placed within a wider distance, certain portions of the reducer layer may not be sprinkled with molten slag to thereby result in zones not embraced by the process. As to the referred space relationship between the tuyere and the furnace wall, it provides for better operating conditions from the standpoint of the lining durability, doghouse functioning and complete sprinkling of the reducer surface with the slag. A reduction in the recommended dimensional relationship may result in more rapid wear of the wall lining under the effect of molten slag streams and in higher heat losses through the doghouses. An increase in said relationship is inexpedient since it may cause the appearance of zones which cannot be utilized in the process of the furnace operation. The depth of immersion of the tuyeres into the slag, established experimentally, ensures the supply of a prescribed amount of molten slag onto the surface of said carbonaceous reducer. In addition, the nozzle edge is arranged far enough from the bottom product to make it turbid or entrain into the circulating slag.

The tuyere nozzle axis can form an angle of not more than 85° to the vertical.

Where said angle is increased, the amount of molten slag thrown out on the surface of said reducer layer diminishes with the resultant reduction in the rate of reducing metal oxides and metal recovery from the slag.

The tuyeres can be introduced into an electric furnace through its roof provided the roof platforms are not blocked up and are convenient for mounting the tuyeres and their servicing.

In case the roof platforms are occupied by other equipment, the tuyeres can be introduced into an electric furnace through its walls.

It is expedient that an electric furnace comprise from 2 to 4 tuyeres per each carbonaceous reducer charging device.

The chosen tuyere charging device ratio makes it possible to avoid blocking up the roof with a too generous amount of equipment and to supply the reducer into the furnace in an amount required for sustaining its layer on the surface of the molten slag.

It is advisable that the furnace space accommodate a vertical partition extending short of the hearth but immersed into the slag and adapted to separate in the furnace space the device for charging solid slag from the tuyeres, carbonaceous reducer charging devices and notches for individual tapping of the liquid products of smelting.

Such arrangement will enable the slag charging zone to be separated from the zone of its treatment and create the most favorable conditions for metal recovery from the slag.

BRIEF DESCRIPTION OF THE DRAWINGS

The present invention will be better understood from a consideration of a detailed description of the preferred embodiment of a method and that of an electric furnace for processing nonferrous molten slags to be had in conjunction with the accompanying drawings, in which.

DETAILED DESCRIPTION OF THE INVENTION

Figure 1:
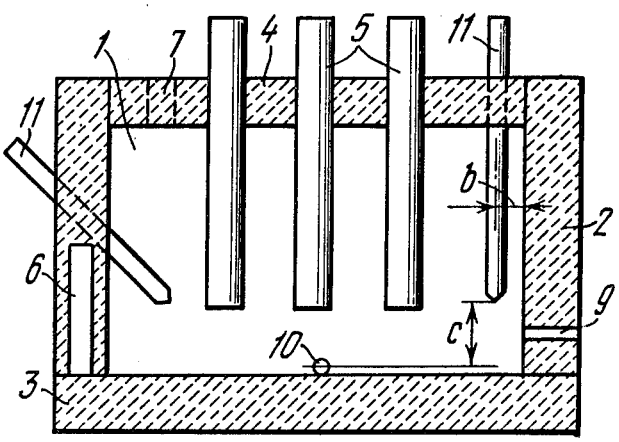
FIG. 1 shows a furnace according to the invention, adaptable to be charged with molten slag, a section by a vertical plane through the longitudinal axis.

Referring now to FIGS. 1 through 4, an electric furnace for processing nonferrous molten slags comprises a space shown at 1 in FIG. 1, defined by walls 2 resting on a hearth 3 and supporting a roof 4.

Figure 2:
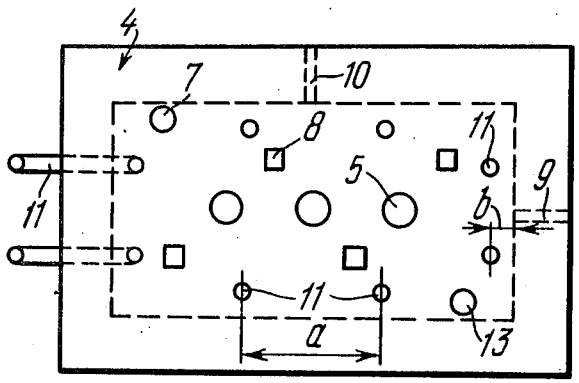
FIG. 2 is a plan view of the furnace illustrated in FIG. 1.

The furnace hearth 3 is lined with a refractory brick based on chromium and magnesium oxides. The furnace walls 2 and roof 4 are produced from electric silica brick. Electrodes 5 are introduced into the furnace space 1 through ports in the furnace roof 4. Built in the furnace walls 2 are doghouses 6. Mounted on the furnace roof 4 are devices (not shown in the drawings) for charging slag into the furnace space 1 through an inlet opening such as shown at 7 in FIG. 2, provided in the furnace roof 4, and for charging a carbonaceous reducer through an inlet opening 8 in the furnace roof 4. The furnace wall 2 is formed with a slag notch such as shown at 9, and with notches for tapping a bottom product, such as shown at 10 in FIG. 1.

Tuyeres 11 intended for feeding an oxygen-free gas into the molten slag are installed through the furnace roof 4, though they may be introduced into the furnace space 1 through appropriate ports in the furnace walls 2.

The tuyeres 11 are spaced apart at a distance (a) (see FIG. 2), substantially equal to that of 3 to 6 electrode diameters, i.e. with the pitch therebetween ranging from 1.5 to 3.0 m; the distance (b) from the furnace walls 2 varies from 1 to 3 electrode diameters, which amounts to 0.5–1.5 m. The axes of the nozzles of the tuyeres 11 are disposed at an angle of not nore than 85° to the vertical. The lower edge of the tuyeres 11 is spaced from the horizontal axis of the notch 10 for tapping a bottom product (matte or metal) at a distance (c) (FIG. 1) equal to that of 0.3 to 2 electrode diameters, which corresponds to that of from 150 to 1000 mm. The total number of the tuyeres 11 exceeds that of the solid carbonaceous reducer charging devices, i.e. there are provided from 2 to 4 tuyeres per device.

The furnace space 1 (FIGS. 3 and 4) can be divided by a vertical partition 12 which extends short of the furnace hearth 3 but is immersed below the level of molten slag. The partition 12 is preferable when solid slag is treated in the furnace, as it permits of separating a part of the furnace space where the slag charging device is placed from that accommodating the tuyeres 11, the carbonaceous reducer charging device and the notches 9 and 10 for separate tapping of slag and bottom product (matte or metal).

For discharging gaseous products from the furnace provision is made for an outlet 13 which may be disposed either in the furnace roof 4 or its wall 2.

The electric furnace in accordance with the invention operates in the following manner.

Molten slag is poured into the furnace space 1 through the inlet opening 7, (FIGS. 1 and 2) the electrodes 5 are energized and lowered into the molten slag. Next, carbonaceous reducer is charged through the inlet opening 8 onto the surface of the molten slag having a temperature of 1200 to 1500° C., in an amount sufficient to promote the formation of a layer and maintaining it on the surface of molten slag as the reducer is being consumed. Thereafter, an oxygen-free neutral or reducing gas, such as nitrogen is fed into the tuyeres 11. The gas is blown into the molten slag in an amount of from 30 to 100 nm$^3$ per ton of slag per hour in flows at an angle of not over 85° to the vertical. Under the effect of gas flows the molten slag is thrown out onto the surface of the carbonaceous reducer layer to undergo filtration therethrough. Thus, the molten slag repeatedly circulates through the layer of carbonaceous reducer, nonferrous metal oxides being reduced therein under the effect of carbon contained in coke and metallic iron formed during the reduction process which is also accompanied by coagulation of metal particles and matte.

Figure 3:
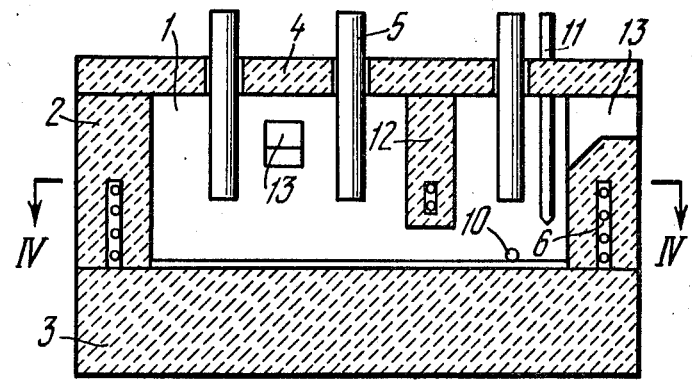
FIG. 3 is a view of a furnace adaptable to be charged with solid slag, a section by a vertical plane through the longitudinal axis.
Figure 4:
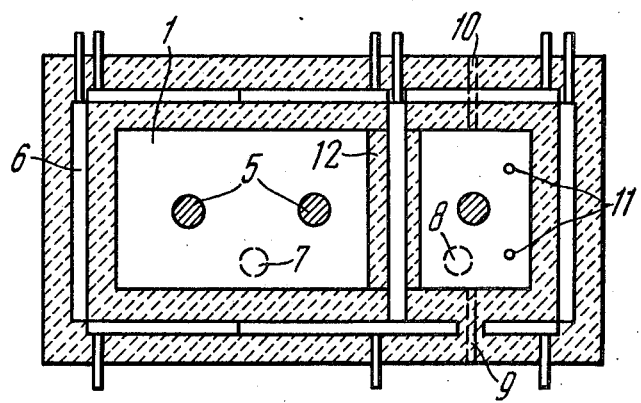
FIG. 4 is a cross-section taken along line IV—IV of FIG. 3.

The degree and rate of recovering heavy nonferrous metals and iron from the slag is adjusted by varying the flow rate of gas (nitrogen) and the location of the bottom tuyere edge with respect to the horizontal axis of the matte notch 10. The bottom product is either a metal or a matte containing copper, nickel, cobalt and iron precipitated therein. It is accumulated on the furnace hearth to be tapped periodically through the notch 10. The depleted slag is tapped continuously or periodically through the notch 9 until a preset level is reached whereupon a new batch of molten slag is poured therein.

Where solid slag is melted, it is good practice to make use of an electric furnace whose space 1 is divided into two parts by a vertical partition 12, such as shown in FIGS. 3 and 4, separating a loading chamber from that adapted for slag treatment and discharging of smelting products.

The solid slag is periodically or continuously charged into the first part of the furnace space through an inlet opening 7 onto the melt bath (premelted slag). On being melted, the solid slag flows under the partition 12 into the second part of the furnace space 1 to be treated therein with carbonaceous reducer.

The process of reducing nonferrous metal oxides is effected in a manner similar to that describing the charging of molten slag into the furnace. Smelting products are tapped through appropriate notches 9 and 10.

The herein-proposed electric furnace has been successfully tested. Given hereinbelow are exemplary embodiments of using said furnace for carrying the method of the invention into effect.

EXAMPLE 1

Granulated slag obtained by the Kivset process (flash-oxidizing smelting) and containing (percent by weight): copper, 0.80; lead, 0.50; zinc, 3.50; iron 25.8 and slag-forming components: calcium oxide, 5–20 and silica (SiO$_2$), 25–35, was continuously fed into the 4.18 m$^2$ melting zone of a double-zone 1000 kVA electric furnace onto a preliminary established slag bath.

The molten slag was continuously passing into a 1.74 m$^2$ carbonaceous reducer zone (a coke filter).

Water-cooled tuyeres were introduced into said slag bath through a furnace roof. The molten slag outflow onto the surface of said carbonaceous reducer (a coke layer) was effected by blowing into the melt an inclined (maximum at an angle of 85° to the vertical axis) stream of nitrogen. The hourly nitrogen consumption amounted to 85 nm$^3$ per ton of slag. The coke was periodically charged on the surface of the slag in the coke filter zone by means of appropriate charging devices mounted in the furnace roof. In this case the height of the coke layer was 36 cm.

Volatile metals together with reactive gases were admitted into an afterburning chamber to be then entrapped in the form of oxides in a bag filter. The dump slag and a bottom product were periodically tapped from the electric furnace through slag and matte notches.

While carrying out said experiment at a molten slag temperature of 1250° C., and the temperature of the coke layer (placed thereon) of 1230° C., the following results were obtained.

The content of metals in the dump slag was as follows (percent by weight): copper, up to 0.12; lead, up to 0.08; zinc, up to 0.90 and iron, up to 10.2.

The degree of recovery attained was: copper, 85; lead, 0.90; zinc, 74.5 and iron, 60.5.

The rate of removing metals from the slags, kg/m$^2$·hr: copper—6.8; lead—4.5; zinc—28.0 and iron—156.0.

EXAMPLE 2

Under conditions similar to those described in Example 1 use was made of an initial slag containing (weight percent): copper, 1.33; lead, 0.83; zinc, 10.8 and iron, 29.2. The following results were obtained at an hourly nitrogen consumption increased up to 100 nm$^3$ per ton of slag, the height of a coke layer reduced to 15 cm, a slag temperature decreased to 1200° C. and with the addition of a sulphidizer in an amount of up to 2% of the slag weight:

The content of metals in the dump slag was as follows (percent by weight): copper, 0.32; lead, 0.10; zinc, 3.64 and iron, 31.2.

Metal contents in matte (weight percent): copper, 12, iron, 63; sulphur, 22.

The degree of metal recovery from the slag was: copper, 73.1; lead, 81.7; zinc, 70.2 and iron, 13.4.

The rate of removing metals from the slag, kg/m$^2$·hr: copper, 7.0; lead, 4.8; zinc, 57.3 and iron, 34.4.

EXAMPLE 3

An initial slag containing (weight percent): copper, 0.60; lead, 0.30; zinc, 5.80 and iron, 29.4 was re-treated in an electric furnace by the method of the invention. The following results were obtained at an hourly nitrogen consumption decreased to 42 nm$^3$/t per ton of slag, a coke layer decreased in height to 20 cm and a slag temperature increased to 1500° C. (at a coke layer temperature of up to 1480° C.):

The content of metals in the dump slag (weight percent): copper, 0.11; lead, 0.02; zinc, 0.63; iron, 10.2.

The degree of recovering said metals, weight percent: copper, 81.5; lead, 93.1; zinc, 90.0; iron, 65.3.

The rate of removing metals from the slag, kg/m$^2$·hr: copper, 4.9; lead, 2.9; zinc, 51.5 and iron, 190.0.

EXAMPLE 4

Using an initial slag containing (weight percent): copper, 0.43; lead, 0.36; zinc, 11.9 and iron, 29.4 at an hourly nitrogen consumption reduced to 40 nm$^3$ per ton of slag, a coke layer increased in height to 40 cm and a slag temperature decreased to 1210° C. (that of the coke layer being 1200° C.) and under otherwise similar conditions gave the following results:

The content of metals in a dump slag amount to (weight percent): copper, 0.18; lead, 0.001; zinc, 1.22 and iron, 11.9.

The degree of recovering metals from the slag, weight percent: copper, 58.2; lead, 100, zinc, 90 and iron, 53.5.

The rate of removing metals from the slag, kg/m$^2$·hr: copper, 2.5; lead, 3.6; zinc, 107.0 and iron, 136.0.

EXAMPLE 5

Using an initial slag containing (weight percent): copper, 0.57; lead, 0.56; zinc, 8.66 and iron, 27.4 at an hourly consumption of nitrogen decreased to 36 nm$^3$ per ton of slag, a coke layer in the bath reduced in height to 20 cm, slag and coke layer temperatures increased to 1480° C. and under otherwise similar conditions gave the following results:

The content of metals in the dump slag (weight percent): copper, 0.12; lead, traces; zinc, 0.28 and iron, 9.76.

The degree of recovering said metals from the slag, weight percent: copper, 79.0; lead, 100; zinc, 96 and iron, 64.0.

The rate of removing said metals from the slag, kg/m$^2$·hr: copper, 4.5; lead, 5.6; zinc, 83.2 and iron, 175.0.

What we claim is:

1. A method of processing nonferrous molten slags comprising: supplying a carbonaceous reducer onto the surface of the molten slag in an amount ensuring the formation of a layer of said carbonaceous reducer and its maintenance on the surface of said molten slag, followed by blowing into said molten slag an oxygen-free gas in an amount and at a rate ensuring recirculation of said molten slag involving its outflow onto the surface of said carbonaceous reducer layer and filtration therethrough.

2. A method of claim 1, wherein said oxygen-free gas is fed into said molten slag having a temperature within the range of from 1200 to 1500° C.

3. A method of claim 1, wherein said oxygen-free gas is fed in an amount ranging from 30 to 100 nm$^3$ per ton of slag per hour.

4. A method of claim 1, wherein the oxygen-free gas is fed into said molten slag in flows at angles not over 85° to the vertical.

5. A method of claim 1, wherein said oxygen-free gas an inert gas.

6. A method of claim 1, wherein said oxygen-free gas is a reducing gas.

* * * * *